(12) United States Patent  
Watanabe et al.

(10) Patent No.: US 8,070,293 B2
(45) Date of Patent: Dec. 6, 2011

(54) DESIGN-SUPERPOSING DISPLAY APPARATUS AND VEHICLE DISPLAY UNIT

(75) Inventors: Takeyoshi Watanabe, Shizuoka (JP);
Tetsuya Sugiyama, Shizuoka (JP);
Hirokazu Yabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 1145 days.

(21) Appl. No.: 11/893,705

(22) Filed: Aug. 17, 2007

(65) Prior Publication Data

US 2008/0049149 A1 Feb. 28, 2008

(30) Foreign Application Priority Data

Aug. 23, 2006 (JP) ................................. 2006-226053

(51) Int. Cl.
*G03B 21/14* (2006.01)

(52) U.S. Cl. ................................. 353/13; 353/28; 353/30

(58) Field of Classification Search .................... 353/11, 353/12, 13, 14, 28, 119, 30, 22, 23, 24, 120
See application file for complete search history.

(56) References Cited

U.S. PATENT DOCUMENTS

| 3,848,974 | A | * | 11/1974 | Hosking et al. | 345/7 |
| 5,053,755 | A | * | 10/1991 | Smith et al. | 345/7 |
| 5,223,868 | A | * | 6/1993 | Coiner, II | 353/13 |
| 5,418,651 | A | * | 5/1995 | Iino et al. | 359/857 |
| 5,519,536 | A | * | 5/1996 | Hoehn | 359/630 |
| 5,615,937 | A | * | 4/1997 | Bellanger | 353/97 |
| 6,580,562 | B2 | * | 6/2003 | Aoki et al. | 359/630 |
| 6,685,347 | B2 | * | 2/2004 | Grutze | 362/487 |
| 6,989,934 | B2 | * | 1/2006 | Aoki et al. | 359/629 |
| 2007/0171142 | A1 | * | 7/2007 | Ikarashi et al. | 345/4 |

FOREIGN PATENT DOCUMENTS

JP 2002-293162 10/2002

* cited by examiner

*Primary Examiner* — William C Dowling
(74) *Attorney, Agent, or Firm* — Edwards Wildman Palmer LLP

(57) ABSTRACT

An object of the present invention is to provide a design-superposing display apparatus for superposing a design above a part of a display surface of a display device. The design-superposing display apparatus includes a design display portion disposed above the display surface for accepting a transmitted light from a rear thereof; a light source disposed outside of the display device for emitting the transmitted light of the design display portion; and a light guide portion extending from the rear of the design display portion toward the light source and guiding the emitted light toward the rear of the design display portion.

5 Claims, 6 Drawing Sheets

DESIGN-SUPERPOSING DISPLAY APPARATUS AND VEHICLE DISPLAY UNIT

BACKGROUND OF THE INVENTION

1. Field of the Invention

The present invention relates to a design-superposing display apparatus to superpose a design onto a part of a display surface of a display device, and a vehicle display unit utilizing the same.

2. Description of the Related Art

A projection type display unit such as head-up display (HUD) has been mounted on a vehicle. The HUD displays a virtual image on a windshield and superposes the virtual image on a foreground. The displayed virtual image is information which can not be displayed on a meter unit due to limited space therein. JP-2002-293162-A discloses a liquid crystal display (LCD) and a vacuum fluorescent display (VFD) as a display device for a HUD apparatus.

The colors of green, red, and blue are available for the VFD. Maximum luminance and lifetime of the respective colors is different. Only green has a required luminance for the HUD apparatus.

FIGS. 10A and 10B show a conventional VFD 100. A design W is formed in a display plane 101 transparent to a light emitted from an LED backlight 110 having a diffusion portion 112 and an LED 111.

The backlight method needs a space in a rear of the VFD 100. A heat sink is usually attached to a rear surface of the high luminance VFD 100. It is preferable to make a large contact area between the VFD 100 and the heat sink. The backlight method reduces the contact area due to a window in the heat sink to allow passage of the LED light, causing reduction of heat dissipation.

SUMMARY OF THE INVENTION

An object of the present invention is to provide a design-superposing display apparatus to superpose a design above a display device without reducing performance of the display device, and a vehicle display unit.

According to a first aspect of the present invention, a design-superposing display apparatus for superposing a design above a part of a display surface of a display device includes a design display portion disposed above the display surface for accepting a transmitted light from a rear thereof; a light source disposed outside of the display device for emitting the transmitted light of the design display portion; and a light guide portion extending from the rear of the design display portion toward the light source and guiding the emitted light toward the rear of the design display portion.

Preferably, the light guide portion has a hollow tube shape for reflecting the light emitted from the light source at an inner wall thereof.

Preferably, the light guide portion includes a first light guide portion and a second light guide portion, the first light guide portion being disposed between the design display portion and the display device, and the second light guide portion extending from the first light guide portion and having a cross-sectional area intersecting a light guide direction larger than that of the first light guide portion.

Preferably, the second light guide portion intersects the first light guide portion with a prescribed angle so that the center light of the light source is reflected to the center of the design display portion.

According to a second aspect of the present invention, a vehicle display unit having the design-superposing display apparatus described above superposes a virtual image on a windshield projected with the display device on a foreground of a vehicle, a superposed image being recognized by a driver.

DETAILED DESCRIPTION OF THE PREFERRED EMBODIMENTS

FIGS. 1-9 show embodiments of a design-superposing display apparatus and a vehicle display unit utilizing the same.

Example 1

Figure 1:
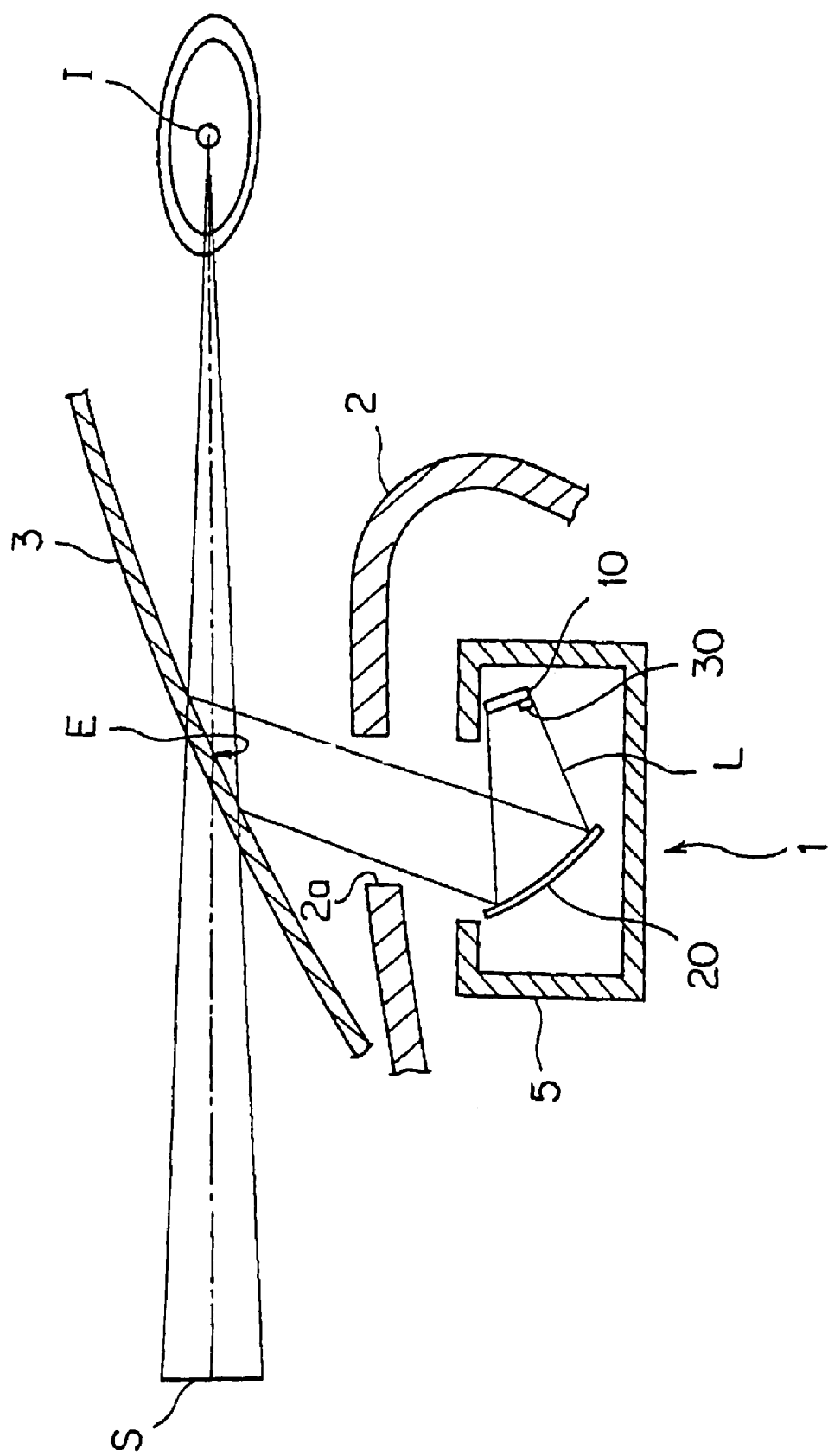
FIG. 1 is a schematic drawing of a vehicle display unit having a design-superposing display apparatus of the present invention.

Referring to FIG. 1, a vehicle display unit 1 is a head-up display (HUD) apparatus and is disposed in an instrument panel 2 of the vehicle. The vehicle display unit 1 includes a display device 10, a reflector 20, and a design-superposing display apparatus 30. The vehicle display unit 1 is received in a receiving case 5.

The display device 10 is a vacuum fluorescent display (VFD) having a high luminance of tens of thousands $cd/m^2$. For example, the display device 10 is formed in a way that a fluorescent material is applied on a ceramic substrate to form anode segments and selectively emit lights. The display device 10 is LCD, TFT, or the like.

The reflector 20 is a mirror, a magnifying mirror, or the like, and is disposed opposite to the display device 10 in the receiving case 5 so that a display light L can project an image on the display device 10 onto a projection area E of a windshield 3 of the vehicle. The embodiment illustrated in FIG. 1 has one reflector 20 but is only exemplary and not limited thereto. A plurality of reflectors 20 may be utilized to reflect the display light L several times. The display light L may be directly projected to the windshield 3 without the reflector 20.

The display device 10 displays the image controlled with a control unit, not shown, and the image is projected onto the windshield 3 through an opening 2a of the instrument panel 2.

The image is then reflected by the projection area E and a virtual image S is formed at foreground. An eye point I of a driver recognizes a superposed image of the virtual image S and the foreground through the windshield 3.

Figure 2:
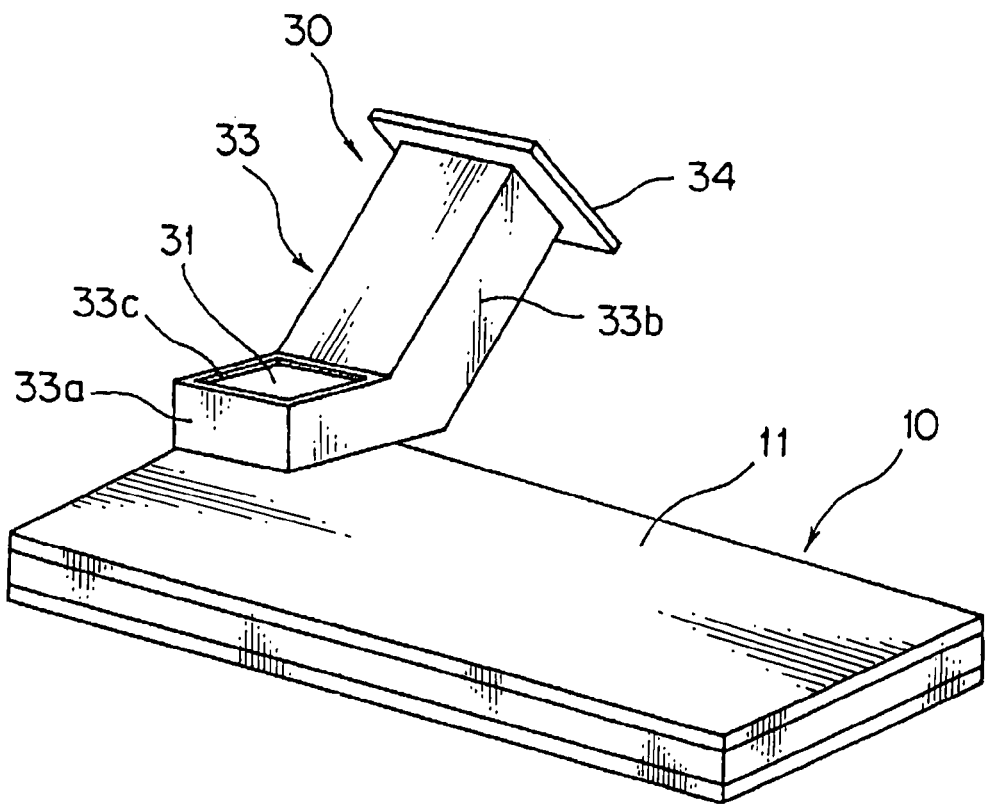
FIG. 2 is a perspective view of an outer appearance of the design-superposing display apparatus and a display device of FIG. 1.
Figure 3:
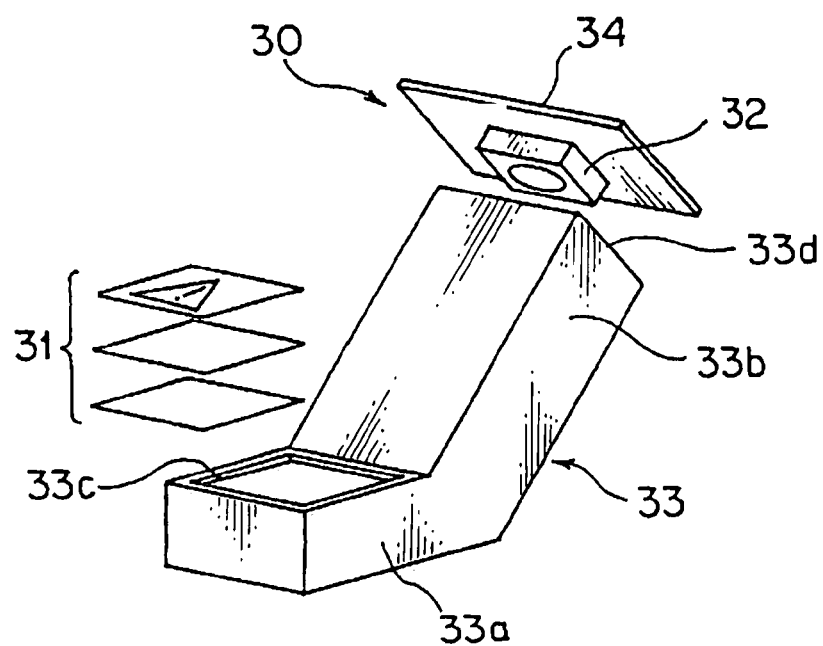
FIG. 3 is an exploded perspective view of the design-superposing display apparatus of the present invention.
Figure 4:
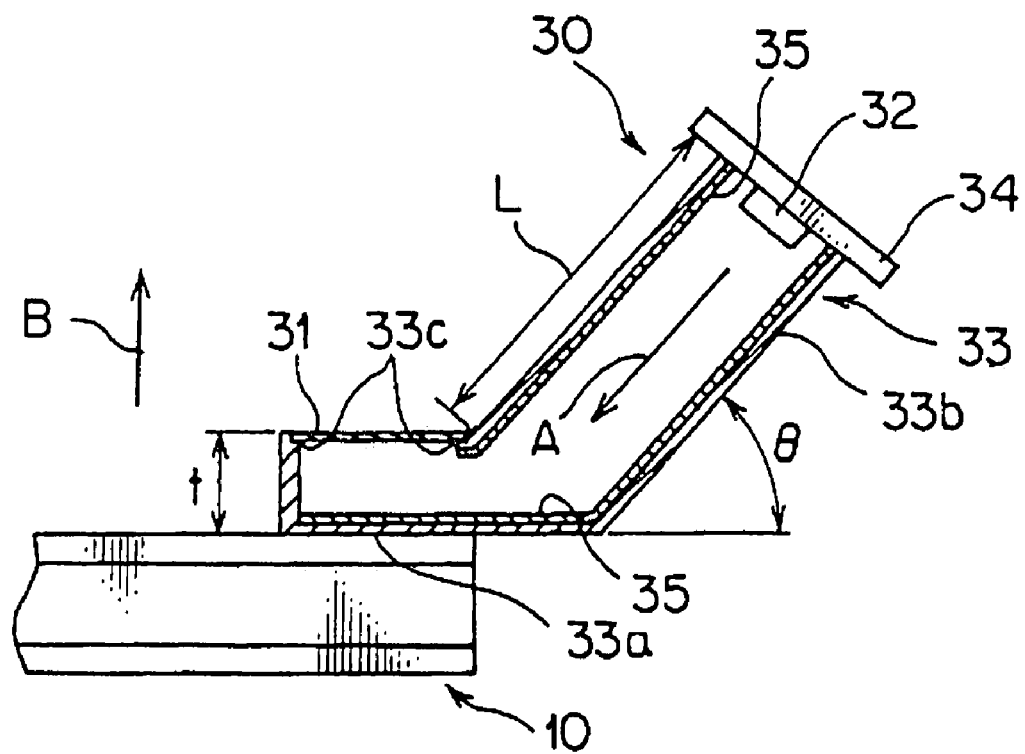
FIG. 4 is a schematic cross-sectional view of the design-superposing display apparatus and the display device.
Figure 10A:
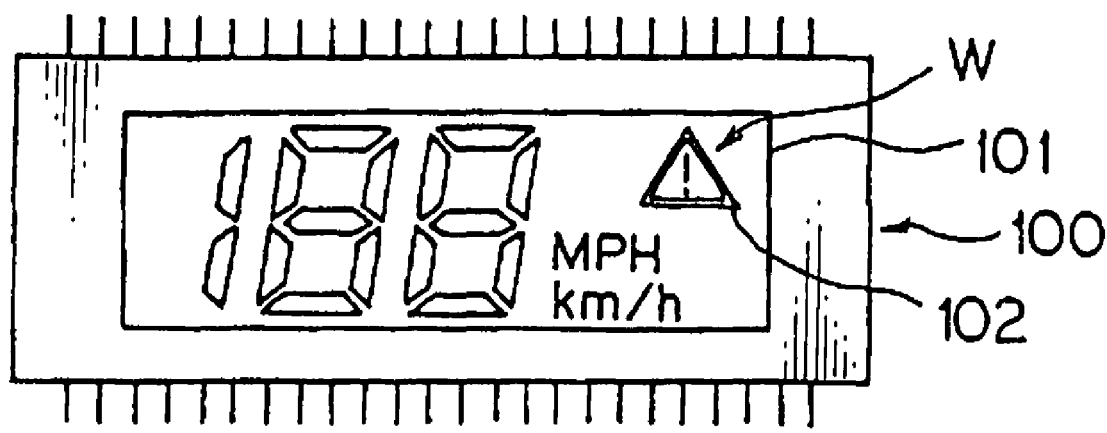
FIG. 10A is a top view of a configuration to superpose a design on a conventional display device.
Figure 10B:
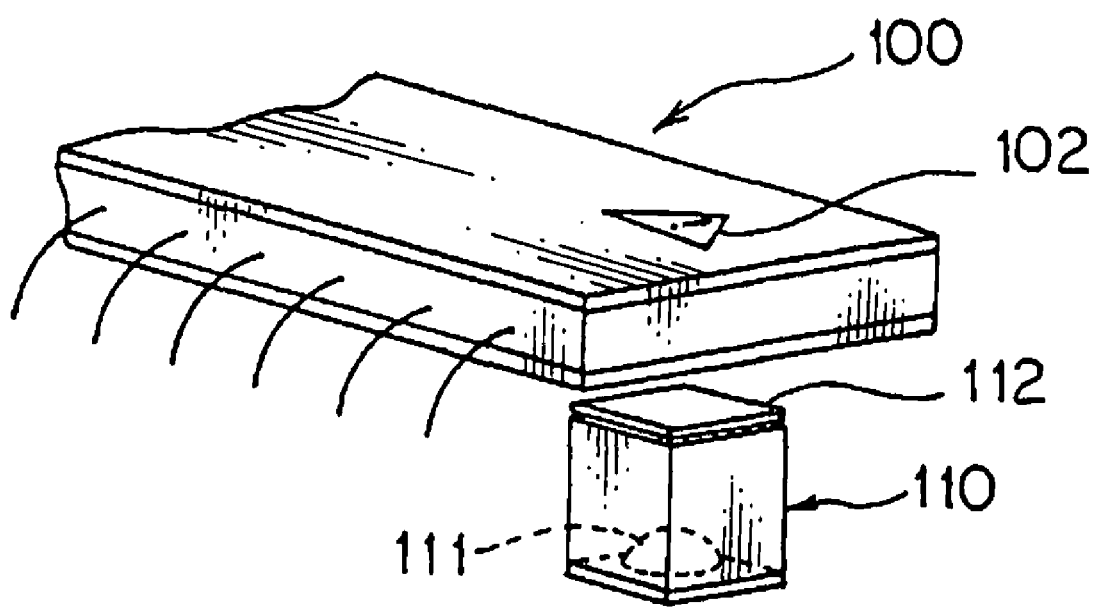
FIG. 10B is a perspective view of the configuration of FIG. 10A.

The design-superposing display apparatus 30 superposes the design above a part of a display surface 11 of the display device 10. Referring to FIGS. 2-4, the design-superposing display apparatus 30 includes a design display portion 31, a light source 32, and a light guide portion 33. The design-superposing display apparatus 30 is held in the receiving case 5 so that the design is not overlapped a number and unit of a speed as shown in FIG. 10A.

The design display portion 31 includes a design pattern portion and other portions formed with a transparent material, such as polycarbonate or optical film. The design display portion 31 is disposed above the surface 11 of the display device 10 to allow passage of the light from behind.

The design display portion 31 is changeable with respect to the light guide portion 33 corresponding to the design pattern, a specification and a kind of the vehicle display unit 1.

The light source 32 is LED and is mounted on a board 34. The control device, not shown, controls light-on/off of the light source 32 via an electrical wire patterned on the board 34. A plurality of light sources 32 may be disposed and the light source 32 may be a bulb.

The light guide portion 33 extends from a rear of the design display portion 31 toward the light source 32 to guide the light along the extension thereof. The light guide portion 33 is made of a synthetic resin or a metal and formed in a hollow tube and an inner wall thereof is covered with a reflection member 35 achieved with reflection treatment of the inner wall, reflecting sheet, or white paint treatment. The reflection member 35 thus guides the light emitted from the light source 32 to the rear of the design display portion 31 without attenuation.

The light guide portion 33 includes a first light guide portion 33a and a second light guide portion 33b. The first light guide portion 33a is disposed between the design display portion 31 and the display device 10. The second light guide portion 33b extends from the first light guide portion 33a to the light source 32 and has a cross-sectional area, which intersects a light guide direction A indicated in FIG. 4, larger than that of the first light guide portion 33a.

The first light guide portion 33a has a mounting portion 33c at a prescribed distance t apart from the display surface 11 to mount the design display portion 31. The mounting portion 33c has an opening a little smaller than the design display portion 31. The first light guide portion 33a is attached to the part of the display surface 11 of the display device 10 so that the light reflected from the light source 32 emits from the opening of the mounting portion 33c in a direction B same as the direction of the display light L.

The light guided in the light guide portion 33 permeates the design display portion 31 and transmits toward the windshield 3. It is apparent that the shorter distance of the prescribed distance t provides an almost same distance from the eye point I to the display device 10 and the design display portion 31. It is essential to make the prescribed distance t as small as possible when a projection type display unit utilizes a magnified image of the display device 10.

The smaller distance t reduces covering of the design display portion 31 over the display light L emitted from the display device 10 and projected toward the eye point I.

The second light guide portion 33b is connected with the first light guide portion 33a with a prescribed angle θ against the display surface 11. The first and second light portions 33a and 33b thus are substantially formed in L shape. This configuration makes the prescribed distance t smaller, or the first light guide portion 33a thinner. One end portion 33d of the second light guide portion 33b abuts on the board 34 and completely covers the light source 32.

A long length L of the second light guide portion 33b attains uniformity of the luminance but reduces the luminance. The short length L reduces uniformity of the luminance but attains a high luminance. The length L of the second light guide portion 33b is adjusted to achieve a desired display luminance of the design display portion 31.

An example of assembly of the design-superposing display apparatus 30 is explained below.

The design display portion 31 having the design pattern portion and the other portions is mounted on the mounting portion 33c of the light guide portion 33. The board 34 mounted with the light source 32 is attached to the end portion 33d of the second light guide portion 33b. The assembly of the design-superposing display apparatus 30 is attached on the receiving case 5.

An operation of the design-superposing display apparatus 30 of the vehicle display unit 1 is explained below.

The display light L of the display device 10 is reflected by the reflector 20 and projected onto the windshield 3. The virtual image S of the image of the display device 10 and the foreground are superposed together through the windshield 3 to the eye point I of the driver.

The design-superposing display apparatus 30 turns on the light source 32 in response to request of a warning display. The light source 32 is positioned outside of the display light L of the display device 10. The light from the light source 32 is guided in the second light guide portion 33b and reflected by the inner wall of the first light guide portion 33a and guided to the rear of the design display portion 31. The light permeates through the design display portion 31 and projects the design pattern portion onto the windshield 3. The driver recognizes the superposed image of the virtual image S such as shown in FIG. 10A.

The design-superposing display apparatus 30 of the present invention is not provided with the backlight source disposed on the rear thereof, so that the display device 10 achieves the high luminance design display without limitation of the rear space. The heat sink can be arranged at the rear of the display device 10, so that the VFD can also be adapted to the display device 10 and keep performance by virtue of the heat sink.

The hollow tube structure of the light guide portion 33 keeps the light from the light source 32 therein and reduces attenuation of the light so as to achieve the high luminance superposed display.

The distance between the design display portion 31 and the display device 10 can be made smaller so as to decrease reduction of the light of the display device around the design-superposing display apparatus 30.

Example 2

A second embodiment of the design-superposing display apparatus 30 is explained. Like parts of the first embodiment are given the same references and explanations are omitted.

A vehicle display unit 1 includes a display device 10, a reflector 20, and a design-superposing display apparatus 30 similar to the first embodiment. The design-superposing display apparatus 30 includes a design display portion 31, a light source 32, and a light guide portion 33.

Figure 5:
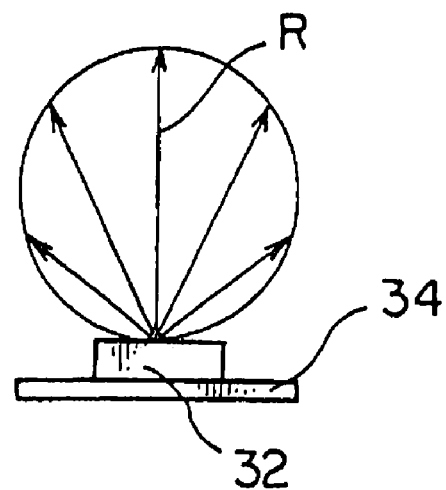
FIG. 5 illustrates a distribution of luminance of light emitted from a light source.

FIG. 5 shows a general distribution of luminance of an emitting light, where the center light has the highest luminance and other lights away from the center light have smaller luminance.

Figure 6:
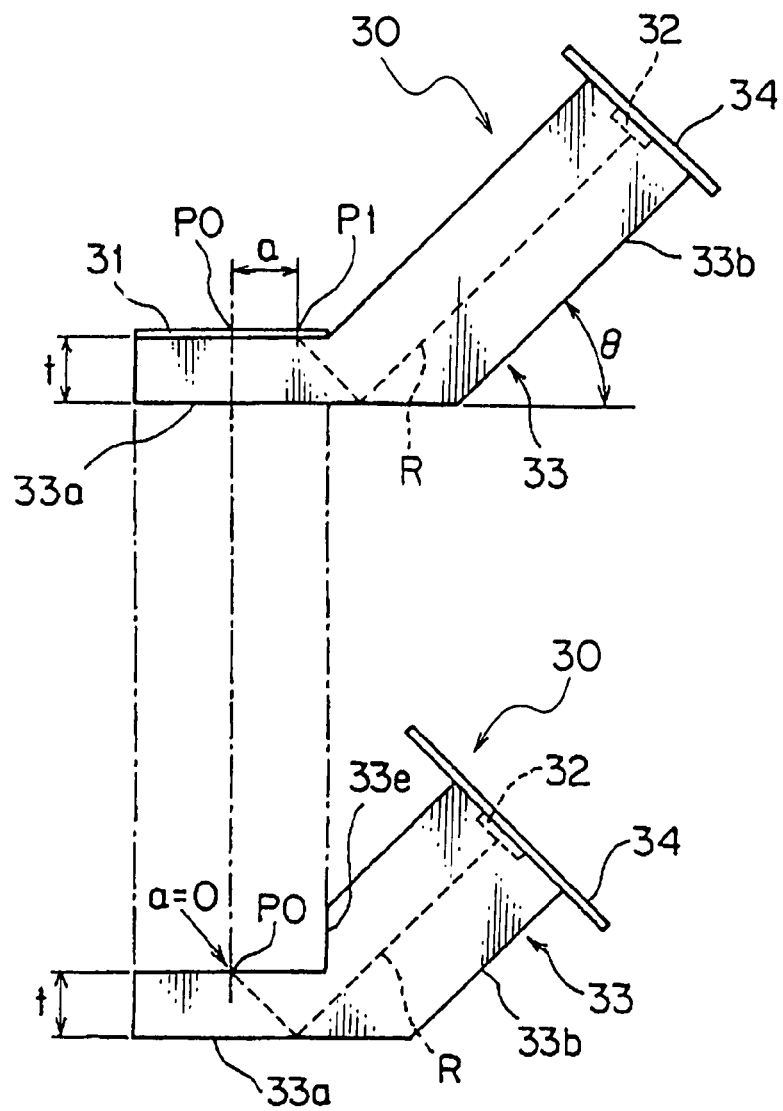
FIG. 6 shows schematic cross-sectional views of a first embodiment (upper drawing) and a second embodiment (lower drawing) for comparison.

The upper figure of FIG. 6 shows the design-superposing display apparatus 30 of the first embodiment in order to compare with that of the second embodiment of the lower figure. In the first embodiment, the center light R of the light source 32 is reflected in the first light guide portion 33*a* and toward a position P1 of the design display portion 31. The position P1 is apart from the center position P0 by a distance a.

The second embodiment of the design-superposing display apparatus 30 includes a step portion 33*e* between the first and second light guide portions 33*a* and 33*b* so that the center light R of the light source 32 is reflected by an inner wall of the first light guide portion 33*a* and forwarded to the center position P0 of the design display portion 31. This configuration thereby keeps uniformity of luminance of the design display portion 31 and achieves high luminance display.

An operation of the second embodiment is explained.

Upon a request of a warning display, the light source 32 disposed outside of the display device 10 is turned on. The light is guided in the second light guide portion 33*b* and reflected at the inner wall of the first light guide portion 33*a* and guided at a rear of the design display portion 31. The center light R is positioned to the center position P0 of the design display portion 31. The guided light lights the design display portion 31 to project a design pattern portion onto a windshield 3. A driver recognizes a virtual image S as shown in FIG. 10A on the windshield 3.

The design-superposing display apparatus 30 of the present invention is not provided a backlight source disposed on a rear thereof, so that the display device 10 achieves a high luminance design display without limitation of a rear space. A heat sink can be arranged at the rear of the display device 10, so that the VFD can also be adapted to the display device 10 and keep a specified performance by virtue of the heat sink.

The second light guide portion 33*b* intersects the first light guide portion 33*a* with a prescribed angle so that the center light R of the light source 32 is reflected to the center position P0 of the design display portion 31. The increase of light intensity at the design display portion 31 achieves superposing display of the design pattern portion with uniform and high luminance.

In the first and second embodiments, it is made to effort the prescribed distance t between the design display portion 31 and the display device 10 shorter. A light guide portion 33 shown in FIG. 7 can be utilized for the vehicle display unit 1 when the display unit 1 has no restriction about the prescribed distance t.

The light guide portion 33 includes a first light guide portion 33*a* having a reflecting surface 33*f* and a second light guide portion 33*b*. A light emitted from a light source 32 is reflected by the reflecting surface 33*f* and the center light is projected onto a center position P0 of a design display portion 31.

Figure 7:
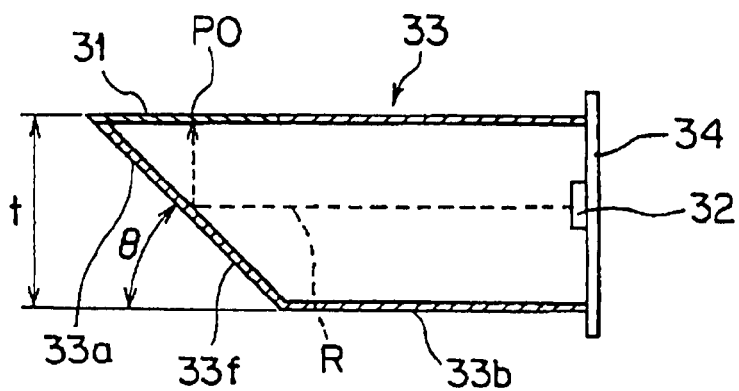
FIG. 7 shows another embodiment of a light guide portion having a tube shape of the design-superposing display apparatus.

The light guide portion 33 of FIG. 7 achieves the same effect as the first and second embodiments of the design-superposing display apparatus 30. The light guide portion 33 of FIG. 7 does not include the bending portion included in the first and second embodiments, so that the manufacturing becomes simple, resulting low cost product. It is preferable to utilize the design-superposing display apparatus 30 of FIG. 7 for the vehicle display unit 1 when the vehicle display unit 1 has no restriction about the prescribed distance t.

The embodiments described above have the light guide portions 33 with the hollow tube shape but the invention is not limited thereto. The light guide portion 33 may have a light guide plate 33' as shown in FIGS. 8-9.

A design-superposing display apparatus 30 includes a design display portion 31, light sources 32, the light guide plate 33' as the light guide portion. The light guide plate 33' has the same shape as the design display portion 31. The light sources 32 disposed aside of a display device 10 emit lights into the light guide plate 33' and the lights are guided to a rear of the design display portion 31. The plurality of light sources 32 achieve high luminance.

Figure 8:
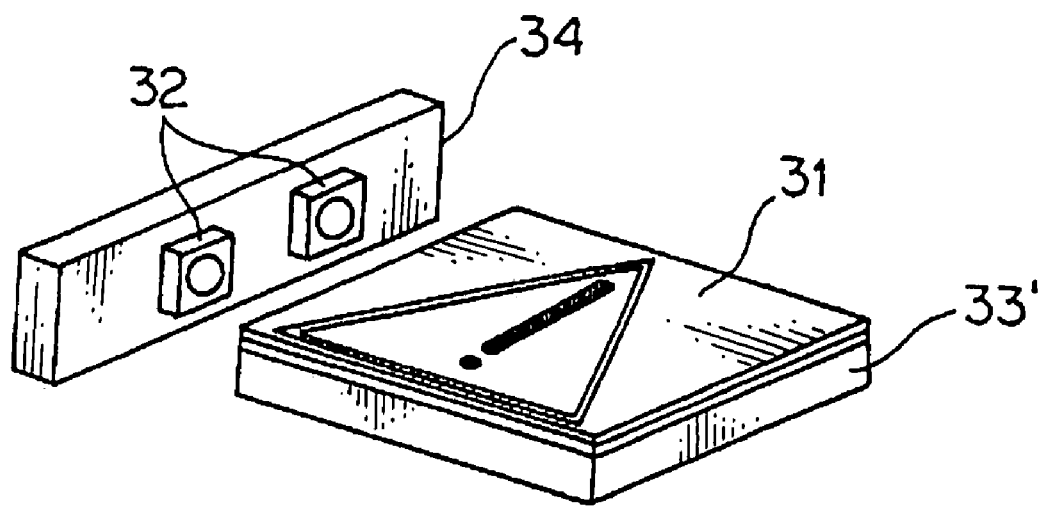
FIG. 8 is a schematic configuration of a design superposing display apparatus utilizing a light guide plate as the light guide portion.
Figure 9:
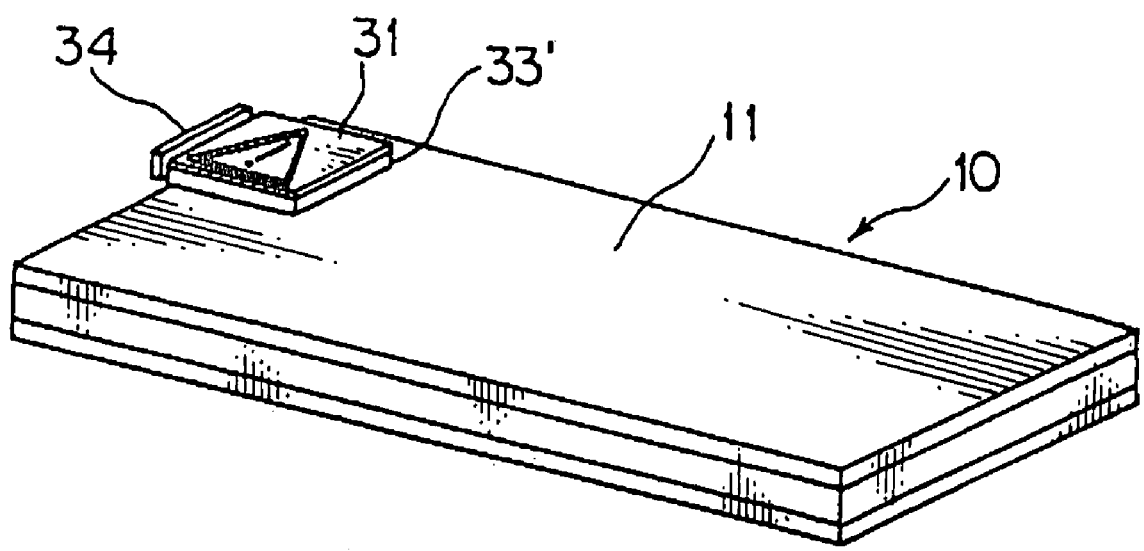
FIG. 9 is a perspective view showing that the design-superposing display apparatus is disposed on a surface of a display device.

The configuration of FIGS. 8-9 provides also the same function as the first and second embodiments. The embodiment of FIGS. 8-9 is adapted to the vehicle display unit 1 having restriction about the prescribed distance t.

The embodiments shown are purely exemplary and not limited thereto. Any modification and alteration are within spirit and scope of the present invention.

What is claimed is:

1. A design-superposing display apparatus for superposing a design above a part of a display surface of a display device, the design-superposing display apparatus comprising:
    a design display portion disposed above the display surface for accepting a transmitted light from a rear thereof;
    a light source disposed outside of the display device for emitting the transmitted light of the design display portion; and
    a light guide portion extending from the rear of the design display portion toward the light source and guiding the emitted light toward the rear of the design display portion.

2. The design-superposing display apparatus as claimed in claim 1, wherein the light guide portion, has a hollow tube shape for reflecting the light emitted from the light source at an inner wall thereof.

3. The design-superposing display apparatus as claimed in claim 1, wherein the light guide portion includes a first light guide portion and a second light guide portion, the first light guide portion being disposed between the design display portion and the display device, and the second light guide portion extending from the first light guide portion and having a cross-sectional area intersecting a light guide direction larger than that of the first light guide portion.

4. The design-superposing display apparatus as claimed in claim 3, wherein the second light guide portion intersects the first light guide portion with a prescribed angle so that the center light of the light source is reflected to the center of the design display portion.

5. A vehicle display unit having the design-superposing display apparatus as claimed in claim 1, the vehicle display unit superposing a virtual image on a windshield projected with the display device on a foreground of a vehicle, a superposed image being recognized by a driver.

* * * * *